(12) United States Patent
Staub et al.

(10) Patent No.: US 11,397,118 B2
(45) Date of Patent: Jul. 26, 2022

(54) CONTACT FORCE MEASURING DEVICE AND PROCESS FOR MEASURING A CONTACT FORCE USING THE CONTACT FORCE MEASURING DEVICE

(71) Applicant: KISTLER HOLDING AG, Winterthur (CH)

(72) Inventors: Reinhard Staub, Herrliberg (CH); Andri Lehmann, Neuhausen am Rheinfall (CH); Claudio Cavalloni, Regensdorf (CH)

(73) Assignee: Kistler Holding AG, Winterthur (CH)

( * ) Notice: Subject to any disclaimer, the term of this patent is extended or adjusted under 35 U.S.C. 154(b) by 156 days.

(21) Appl. No.: 16/905,417

(22) Filed: Jun. 18, 2020

(65) Prior Publication Data
US 2020/0408624 A1 Dec. 31, 2020

(30) Foreign Application Priority Data

Jun. 25, 2019 (EP) ..................................... 19182313

(51) Int. Cl.
*G01L 5/00* (2006.01)
*G01L 1/16* (2006.01)

(52) U.S. Cl.
CPC .............. *G01L 5/0057* (2013.01); *G01L 1/16* (2013.01)

(58) Field of Classification Search
CPC ............ H01R 13/2421; H01R 2201/20; G01R 31/069; G01L 5/0057; G01L 5/167; G01N 2203/0019
See application file for complete search history.

(56) References Cited

U.S. PATENT DOCUMENTS

| 3,388,590 A | * | 6/1968 | Dryden | .............. H01R 13/6683 73/771 |
| 3,605,234 A | * | 9/1971 | Bogursky | .............. H01R 43/22 29/705 |
| 3,922,600 A | * | 11/1975 | Roveti | ................. H01R 13/648 324/508 |

(Continued)

FOREIGN PATENT DOCUMENTS

| CN | 1508524 A | 6/2004 |
| CN | 202614446 U | 12/2012 |

(Continued)

OTHER PUBLICATIONS

DE_4003552_A1_I_English Translation (Year: 1991).*

(Continued)

*Primary Examiner* — Tran M. Tran
(74) *Attorney, Agent, or Firm* — Dority & Manning, P.A.

(57) ABSTRACT

A contact force measuring device for measuring a contact force of a spring contact includes a measuring probe having a height in a contact region identical to the height of the contact pin that fits into an opening defined between a pair of opposing spring contact arms of the spring contact. The probe includes an upper insulator element attached to an upper side of a piezoelectric element, and a lower insulator element is attached to a lower side of the piezoelectric element opposite the upper side. The contact force measuring device includes a holding device connected to one end of the probe, an evaluation unit, a supporting device and a positioning device.

15 Claims, 5 Drawing Sheets

(56) References Cited

U.S. PATENT DOCUMENTS

| | | | | | |
|---|---|---|---|---|---|
| 4,211,108 | A | * | 7/1980 | Seitz | G01L 5/0033 |
| | | | | | 73/862.01 |
| 4,246,783 | A | * | 1/1981 | Steven | G01L 5/0057 |
| | | | | | 73/161 |
| 4,380,171 | A | * | 4/1983 | Smith | G01L 1/22 |
| | | | | | 73/161 |
| 4,667,512 | A | * | 5/1987 | Buddwalk | G01L 5/0057 |
| | | | | | 73/161 |
| 4,668,466 | A | * | 5/1987 | Rylatt | G01L 5/0057 |
| | | | | | 376/245 |
| 4,954,811 | A | * | 9/1990 | Chatigny | G01L 1/16 |
| | | | | | 310/332 |
| 5,024,106 | A | * | 6/1991 | Hettinger | G01L 1/18 |
| | | | | | 73/161 |
| 5,076,106 | A | * | 12/1991 | Buddwalk | G01L 5/0057 |
| | | | | | 73/862.541 |
| 5,214,967 | A | * | 6/1993 | Grogan | G01L 1/16 |
| | | | | | 73/862.542 |
| 5,273,456 | A | * | 12/1993 | Muzslay | H01R 13/641 |
| | | | | | 439/188 |
| 5,777,239 | A | * | 7/1998 | Fuglewicz | G01L 23/10 |
| | | | | | 73/862.68 |
| 5,890,930 | A | * | 4/1999 | Gerow | H01R 31/06 |
| | | | | | 439/651 |
| 7,138,977 | B2 | * | 11/2006 | Kinerk | G06F 3/0487 |
| | | | | | 345/156 |
| 7,922,495 | B2 | * | 4/2011 | Masuda | H01R 12/87 |
| | | | | | 439/59 |
| 8,604,801 | B2 | * | 12/2013 | Tarone | G01R 31/69 |
| | | | | | 324/538 |
| 8,773,255 | B2 | * | 7/2014 | Montena | G01R 31/343 |
| | | | | | 340/535 |
| 9,537,277 | B2 | * | 1/2017 | Yost | H01R 43/048 |
| 9,583,845 | B1 | * | 2/2017 | Heistand, II | H01R 12/87 |
| 9,714,965 | B2 | * | 7/2017 | Crittenden | G01R 22/068 |
| 9,885,679 | B2 | * | 2/2018 | Lee | G01R 27/205 |
| 9,915,695 | B2 | * | 3/2018 | Lee | G01R 31/69 |
| 10,082,447 | B2 | * | 9/2018 | Estevo | G01R 1/00 |
| 10,374,369 | B2 | * | 8/2019 | Eldridge | H02H 11/00 |
| 10,838,018 | B1 | * | 11/2020 | Mahoney | G01R 1/0466 |
| 10,938,165 | B2 | * | 3/2021 | Schiefelbein | H01L 41/1132 |
| 11,128,086 | B2 | * | 9/2021 | Hulscher | H01R 13/5205 |
| 11,175,352 | B2 | * | 11/2021 | Shultz | G01R 31/69 |
| 2015/0308863 | A1 | * | 10/2015 | Chen | G01D 5/268 |
| | | | | | 385/12 |
| 2017/0370962 | A1 | * | 12/2017 | Cook | G01L 9/0022 |
| 2018/0113033 | A1 | * | 4/2018 | Mastrogiacomo | G01L 1/16 |
| 2020/0251870 | A1 | * | 8/2020 | Yang | G01R 31/69 |
| 2021/0103008 | A1 | * | 4/2021 | Zurek | G01R 31/69 |
| 2021/0278481 | A1 | * | 9/2021 | Lubeley | G01R 15/183 |

FOREIGN PATENT DOCUMENTS

| | | |
|---|---|---|
| DE | 2941886 | 4/1981 |
| DE | 4003552 | 8/1991 |
| FR | 2516238 | 5/1985 |

OTHER PUBLICATIONS

Translation of Chinese Office Action, dated Oct. 11, 2021, 11 pages.
Extended European Search Report, dated Jan. 14, 2020, 9 pages.

* cited by examiner

CONTACT FORCE MEASURING DEVICE AND PROCESS FOR MEASURING A CONTACT FORCE USING THE CONTACT FORCE MEASURING DEVICE

FIELD OF THE INVENTION

The invention relates to a contact force measuring device for measuring a contact force of a spring contact that includes a contact pin and spring contact arms that apply a contact force onto the contact pin disposed in contact with the spring contact arms. The invention also relates to a process that uses the contact force measuring device for measuring a contact force of a spring contact.

BACKGROUND OF THE INVENTION

Plug-in electrical connections are well known. They enable electrical lines to be contacted. For this purpose, a male part of the plug-in electrical connection (including an outwardly protruding contact pin) is mechanically and electrically contacted with a female part of the plug-in electrical connection (including an inwardly facing contact opening). In contact with one another, the male and female parts are directly on top of each other in a contact area and a contact force is generated between the male and female parts during this relative disposition. The contact force ensures a permanently stable mechanical and electrical contact of the plug-in electrical connection and ensures a permanently low electrical contact resistance of the plug-in electrical connection.

In the following, the present invention will be exemplarily described with reference to a plug-in electrical connection in the form of a spring contact. The spring contact comprises a female part comprising a pair of spring contact arms. A contact opening for receiving a contact pin is formed between the two spring contact arms. For effecting a contacting electrical connection, the contact pin is inserted into the contact opening. When the contact is made between the contact pin and the two spring contact arms, then the spring contact arms apply a contact force onto the contact pin. Each contact arm applies an equal and opposite force to the contact pin, which applies an equal and opposite contact force to each contact arm.

Spring contacts of the aforementioned type are manufactured in large numbers and used in a variety of ways by the industry. These spring contacts have very different dimensions. However, a common feature of spring contacts is that the contact force must achieve a predefined value between narrow tolerance limits. Therefore, for quality control of the spring contacts produced, the spring force is measured by means of a contact force measuring device.

A prior art contact force measuring device is described in DE4003552A1. The contact force measuring device measures a contact force of spring contact arms of a spring contact. The contact force measuring device comprises a measuring probe having outer dimensions identical to those of a contact pin of the spring contact in a contact area. For measuring the contact force the probe is inserted in the contact opening between the pair of spring contact arms so that in a contact area the probe is in mechanical contact to the spring contact arms. The measuring probe comprises a planar piezoelectric film arranged along a horizontal axis between two contact pin halves. The spring contact arms apply the contact force onto the contact pin halves. The two contact pin halves are fabricated from hard metals to keep abrasion low with frequent contacting. The contact pin halves introduce the contact force along a vertical axis onto the piezoelectric film. The contact force is normal to the surface of the piezoelectric film. Under the impact of the contact force, the piezoelectric film generates electrical charges due to the piezoelectric longitudinal effect in an amount which is proportional to the magnitude of the contact force. The quantity of electrical charges generated is tapped off by electrodes on surfaces of the piezoelectric film and is measured and serves as the measure for the contact force. Each of the electrodes is electrically insulated from the contact pin halves by means of an insulating layer.

However, the probe of this contact force measuring device known from the prior art is bending-sensitive. During a measurement the sensor is bent along the vertical axis. In the bent state, the piezoelectric film generates further electrical charges according to the piezoelectric shear effect which are also tapped off by the electrodes on the surfaces of the piezoelectric film and falsify the contact force measurement. Thus, measuring the contact force by means of the well known contact force measuring is imprecise. It is desirable to measure the contact force with a standard deviation of $\leq 1\%$.

During operation, when it is plugged into and out of the spring contact arms, the probe of the contact force measuring device known from the prior art is subject to abrasion. Abrasion alters the outer dimensions of the probe over time which on the one hand falsifies the measurement of the contact force and on the other hand limits the service life of the contact force measuring device.

In addition, the measuring probe of the contact force measuring device known from the prior art has a complex structure. In longitudinal section, the piezoelectric film is provided with electrodes on both sides, an insulating layer is provided on each of the electrodes, and each insulating layer is connected to a contact pin half. Therefore, the manufacture of the contact force measuring device known from the prior art is expensive.

Furthermore, when measuring the contact force by means of the contact force measuring device known from the prior art, the measuring probe and the spring contact arms may be incorrectly mated (obliquely mated) which may falsify the contact force measurement. An additional force component to the contact force may be generated and measured because of this oblique mating. Therefore, it is necessary to repeat the contact force measurement several times to ensure that the contact force is measured in an unfalsified manner which makes the measurement time-consuming. It is therefore desirable to measure the contact force quickly and without errors.

OBJECTS AND SUMMARY OF THE INVENTION

It is a first object of the present invention to provide a contact force measuring device that measures a contact force of a spring contact with high accuracy. A second object of the invention is to make the contact force measuring device durable in operation. A third object of the invention is to provide a contact force measuring device having a structure which can be produced in a cost-effective manner. Moreover, a fourth object of the present invention is to provide a process for measuring a contact force of a spring contact by means of a contact force measuring device which process can be carried out quickly and without errors.

These objects and others have been solved by the features of the contact force measuring device described below and by the features of the process of using same described below.

The invention relates to a contact force measuring device for measuring a contact force of a spring contact; said spring contact comprising a contact pin and spring contact arms; wherein when the contact pin contacts the spring contact arms the spring contact arms apply the contact force onto the contact pin; the contact force measuring device comprises a measuring probe having a height in a contact area that is identical to that of the contact pin; wherein in the contact area the sensor can be contacted with the spring contact arms for measuring the contact force, said measuring probe comprising insulator elements which can be contacted with the spring contact arms.

In contrast to the contact force measuring device known from the prior art, the contact force measuring device according to the invention contacts the spring contact arms via insulator elements. The hard metal contact pin halves of the prior art contact force measuring device have been omitted thus simplifying the structure of the measuring probe resulting in cost-effective production.

Preferably, the insulator elements directly contact the spring contact arms via contact surfaces. Moreover, the contact surfaces have a Vickers hardness in the range from 1200 to 1500. Therefore, the contact surfaces of the insulator elements are very abrasion-resistant enabling a very high number of contacts of $10^6$. Thus, the contact force measuring device according to the invention is very durable in operation. Although the contact pin halves of the prior art contact force measuring device are made of hard metal and the hard metal that is normally used in mechanical engineering is martensitic stainless chrome steel with a material number of 14016, the Vickers hardness of this hard metal is less than 200. Thus, the contact force measuring device according to the invention has a hardness that is almost one order of magnitude higher making it very durable in operation.

Preferably, the insulator elements have an modulus of elasticity (elastic modulus) in the range of 350 GPa to 470 GPa. The contact pin halves of the contact force measuring device known from the prior art are made of hard metal. A hard metal that is commonly used in mechanical engineering is martensitic stainless chrome steel having a material number of 1.4016. The elastic modulus of this hard metal is 220 GPa. Thus, the elastic modulus of the insulator elements of the contact force measuring device according to the present invention is approximately twice as high as that of the hard metal of the contact pin halves. Thus, the measuring probe of the contact force measuring device according to the invention has a significantly higher bending stiffness as compared to that of the prior art.

The invention also relates to a process for measuring a contact force of a spring contact by means of a contact force measuring device; said spring contact comprising a contact pin and spring contact arms; wherein when contacting the contact pin with the spring contact arms said spring contact arms apply the contact force onto the contact pin; said contact force measuring device comprises a measuring probe having outer dimensions in a contact area identical to those of the contact pin; in the contact area the measuring probe can be contacted with the spring contact arms for measuring the contact force, wherein said measuring probe is held in a holding device in a predefined measuring state; said spring contact arms are positioned by a positioning device in a predefined measuring position; and wherein said measuring probe comprises insulator elements which insulator elements contact in the contact area with the spring arms in the predefined measuring position.

The use of a holding device for holding the measuring probe in a predefined measuring state and the use of a positioning device for positioning the spring contact arms in a predefined measuring position enables the contact force to be measured quickly and without errors. Furthermore, this enables measuring of the contact force in a very precise manner with a standard deviation of ≤1%.

BRIEF DESCRIPTION OF THE DRAWINGS

Aspects and advantages of the invention are set forth below in the following description, or may be obvious from the description, or may be learned through practice of embodiments of the invention. Those of ordinary skill in the art will better appreciate the features and aspects of such embodiments, and others, upon review of the specification. A full and enabling disclosure of the present invention, including the best mode thereof to one skilled in the art, is set forth more particularly in this specification, including reference to the accompanying figures, which are incorporated in and constitute a part of this specification. These figures illustrate at least one presently preferred embodiment of the invention as well as some alternative embodiments. These figures, together with the written description, explain the principles of the invention but by no means are intended to be exhaustive of every possible embodiment of the invention.

DETAILED DESCRIPTION OF EXEMPLARY EMBODIMENTS

Figure 1:
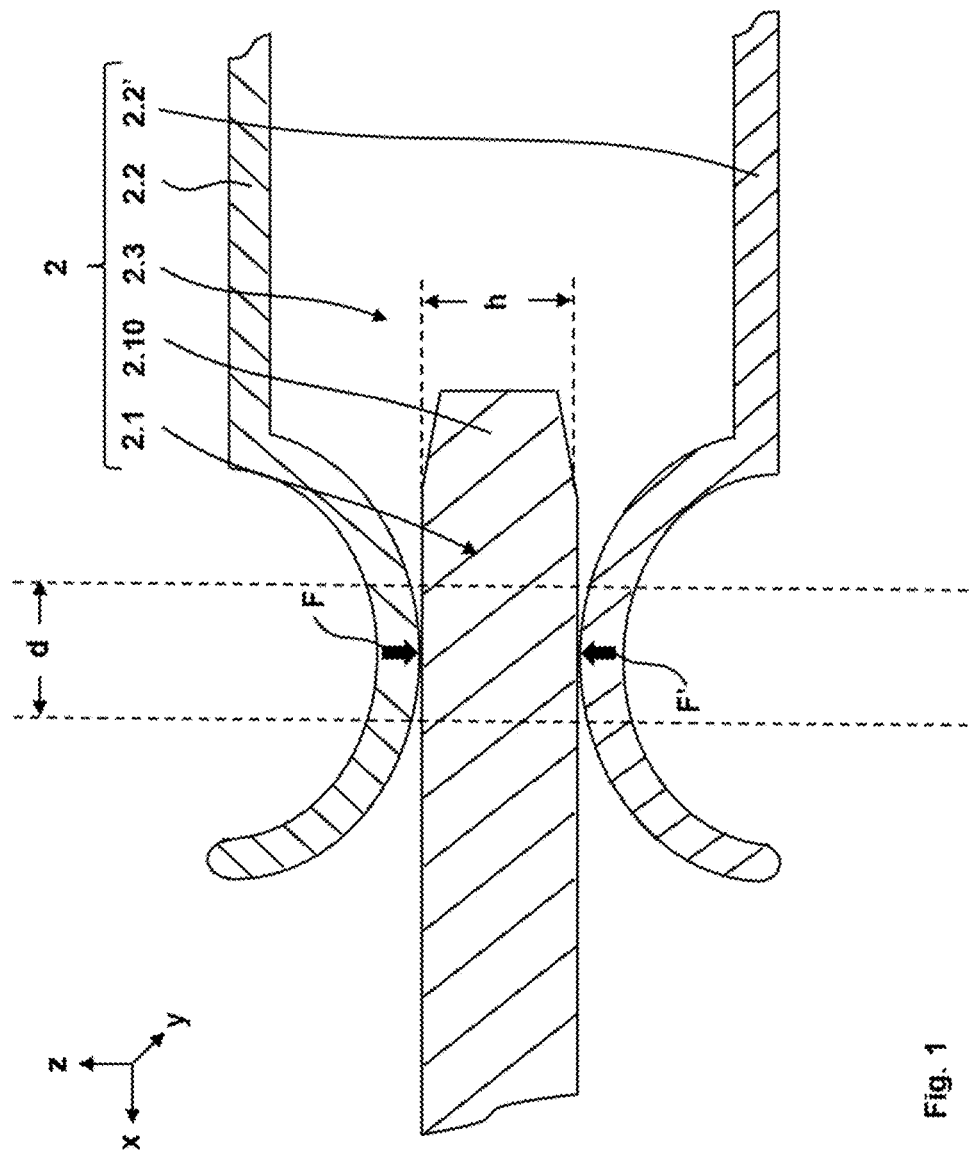
FIG. 1 shows a cross-sectional view of a portion of a conventional spring contact connection with the contact pin and spring contact arms.

Reference will now be made in detail to present exemplary embodiments of the invention, wherein one or more examples of which are illustrated in the accompanying drawings. The detailed description uses numerical and/or letter designations to refer to features in the drawings. Like or similar designations in the drawings and description have been used to refer to like or similar parts of the embodiments of the invention. It is understood that terms like "first" and "second" or "upper" and "lower" or "front" and "back" or "proximal" and "distal" are relative terms that are used to denote relative dispositions that useful in understanding aspects of the different embodiments of the invention described herein.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It is to be understood that the ranges and limits mentioned herein include all sub-ranges located within the prescribed limits, inclusive of the limits themselves unless otherwise stated. For instance, a range from 100 to 1200 also includes all possible sub-ranges, examples of which are from 100 to 150, 170 to 190, 153 to 162, 145.3 to 149.6, and 187 to 1200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

FIG. 1 shows in a cross-sectional view, a portion of a conventional spring contact 2 comprising a contact pin 2.1 and two spring contact arms 2.2, 2.2'. Spring contact 2 is made of electrically conductive material such as pure metals, metal alloys and the like. Each spring contact arm 2.2, 2.2' has a spring constant. A contact opening 2.3 for the contact pin 2.1 is formed between the two spring contact arms 2.2, 2.2'. Contact pin 2.1 has a tapered front end 2.10. The height of the tapered front end 2.10 is lower along the vertical axis z than a height h of the main body of the contact pin 2.1, which main body will be in physical contact with each spring contact arm 2.2, 2.2'.

For contacting, contact pin 2.1 is inserted along a horizontal axis x into contact opening 2.3. In a contact area d, contact pin 2.1 mechanically and electrically contacts the spring contact arms 2.2, 2.2'. During the insertion process, first the tapered front end 2.10 of contact pin 2.1 contacts the spring contact arms 2.2, 2.2' and deflects the spring contact arms 2.2, 2.2' along a vertical axis z. Contact pin 2.1 is inserted in contact opening 2.3 along the horizontal axis x until the tapered front end 2.10 is completely accommodated in the contact opening 2.3 and not in physical contact with the spring contact arms 2.2, 2.2'. As shown in FIG. 1, the main body of the contact pin 2.1 is then received along the vertical axis z with its height h between the spring contact arms 2.2, 2.2'. In response to their spatial deflection, each respective spring contact arm 2.2, 2.2' exerts a respective contact force F, F' along the vertical axis z onto the inserted contact pin 2.1. This contact force F, F' acts in a contact area d. The contact force F, F' ranges from 2N to 50N depending on the dimensions of the spring contact 2. A length of the contact pin 2.1 along the horizontal axis x is for example 12 mm.

The height h of the contact pin 2.1 along the vertical axis z is for example 0.6 mm or 0.8 mm. A width of the contact pin 2.1 along a diagonal axis y is for example 2.4 mm. In the example as shown in FIG. 1, the contact area d has a length of 1 mm along the horizontal axis x. The length of the contact area d along the horizontal axis x is 0.5 mm to 4 mm depending on the dimensions of the spring contact 2.

FIGS. 2 to 5 show two preferred embodiments of a contact force measuring device 10. The contact force measuring device 10 measures the contact force F, F' of the spring contact 2 as shown in FIG. 1. The representations are placed in a coordinate system with axes x, y, z. The three axes x, y, z are perpendicular to each other and meet in a center.

The contact force measuring device 10 comprises a measuring probe 1, a holding device 3, a supporting device 4, a positioning device 5 and an evaluation unit 7.

In the contact area d, the measuring probe 1 has identical external dimensions to those of the contact pin 2.1 of the spring contact 2. In particular, the measuring probe 1 has a height h' along the vertical axis z in the contact area d which is identical to the height h of the contact pin 2.1. Measuring probe 1 has a tapered front end 1.10. The tapered front end 1.10 has a height along the vertical axis z that is lower than the height h' of the measuring probe 1.

Measuring probe 1 is mechanically secured to the holding device 3. Measuring probe 1 is held in the holding device 3 in a predefined measuring state. The predefined measuring state of the measuring probe 1 has a spatial resolution along each of the three axes x, y, z that is specific for the spring contact. The spatial resolution specific for the spring contact is less than +/−25 μm, preferably +/−5 μm. In the context of the present invention, the phrase "holding with a spatial resolution specific for the spring contact" means that the measuring probe 1 may occupy the predefined measuring state for any desired period of time and with a spatial deviation of less than +/−25 μm, preferably of +/−5 μm.

Spring contact arms 2.2, 2.2' are mechanically secured to the supporting device 4. Spring contact arms 2.2, 2.2' are held in the supporting device 4. Advantageously, each spring contact arm 2.2, 2.2' is held in at least one floating bearing 4.1, 4.1'. Each floating bearing 4.1, 4.1' holds a spring contact arm 2.2, 2.2' along the horizontal axis x and the diagonal axis y with a play of +/−10 μm. Thus, floating bearing 4.1, 4.1' having the play of +/−10 μm enables the spring contact arms 2.2, 2.2' to be spatially aligned along the horizontal axis x and the diagonal axis y in the supporting device 4.

Spring contact arms 2.2, 2.2' are arranged at the positioning device 5 via the supporting device 4. Positioning device 5 is driven by a motor and enables the spring contact arms 2.2, 2.2' to be positioned in the coordinate system. Preferably, positioning device 5 comprises at least one drive along the horizontal axis x. For carrying out a measurement procedure, the drive moves the supporting device 4 and the spring contact arms 2.2, 2.2' mechanically attached thereto along the horizontal axis x into a predefined measuring position. This is called "positioning". At the end of the measurement procedure, the drive moves the supporting device 4 and the spring contact arms 2.2, 2.2' mechanically attached thereto along the horizontal axis x out of the predefined measuring position. This is called "removing".

Thus, positioning device 5 positions the spring contact arms 2.2, 2.2' in the predefined measuring position with a spatial resolution specific for the spring contact of less than +/−25 μm, preferably of +/−5 μm, at least along the horizontal axis x. In the context of the present invention, the term "positioning with a spatial resolution specific for the spring contact" means that the spring contact arms 2.2, 2.2' may occupy the predefined measuring position repeatable as often as desired with a spatial deviation along the horizontal axis x of less than +/−25 μm, preferably of +/−5 μm.

The person skilled in the art knowing the present invention may also implement a positioning device with three drives where one drive each moves the spring contact arms along exactly one of the axes x, y, z. Using three drives it will be possible for those skilled in the art to position the spring contact arms with a spatial resolution specific for the spring contact of less than +/−25 μm, preferably +/−5 μm along each of the three axes x, y, z.

The person skilled in the art knowing the present invention may of course also perform the measurement with reversed kinematics and position the measuring probe by the positioning device in the predefined measuring position instead of positioning the spring contact arms by the positioning device in the predefined measuring position. Accordingly, it will then also be possible to hold the spring contact arms by the holding device in the predefined measuring state instead of holding the measuring probe by the holding device in the predefined measuring state.

Figure 2:
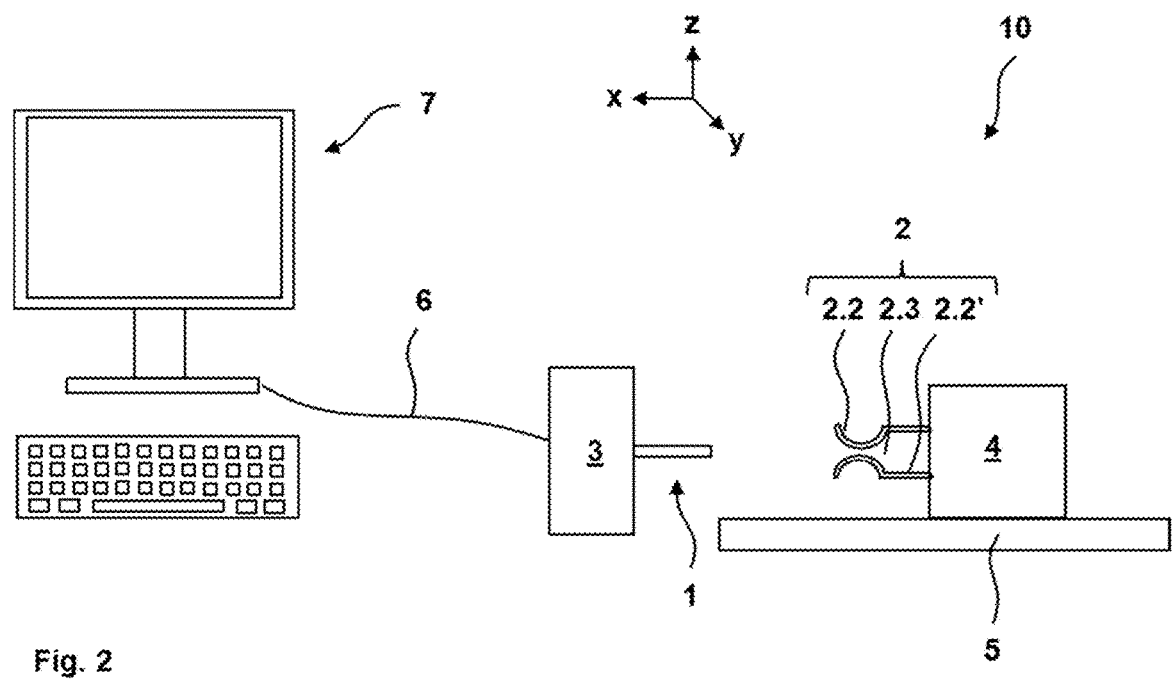
FIG. 2 shows a schematic view of a contact force measuring device comprising a measuring probe prior to positioning the probe between the spring contact arms of the spring contact as shown in FIG. 1 in a predefined measuring position with the measuring probe.
Figure 3:
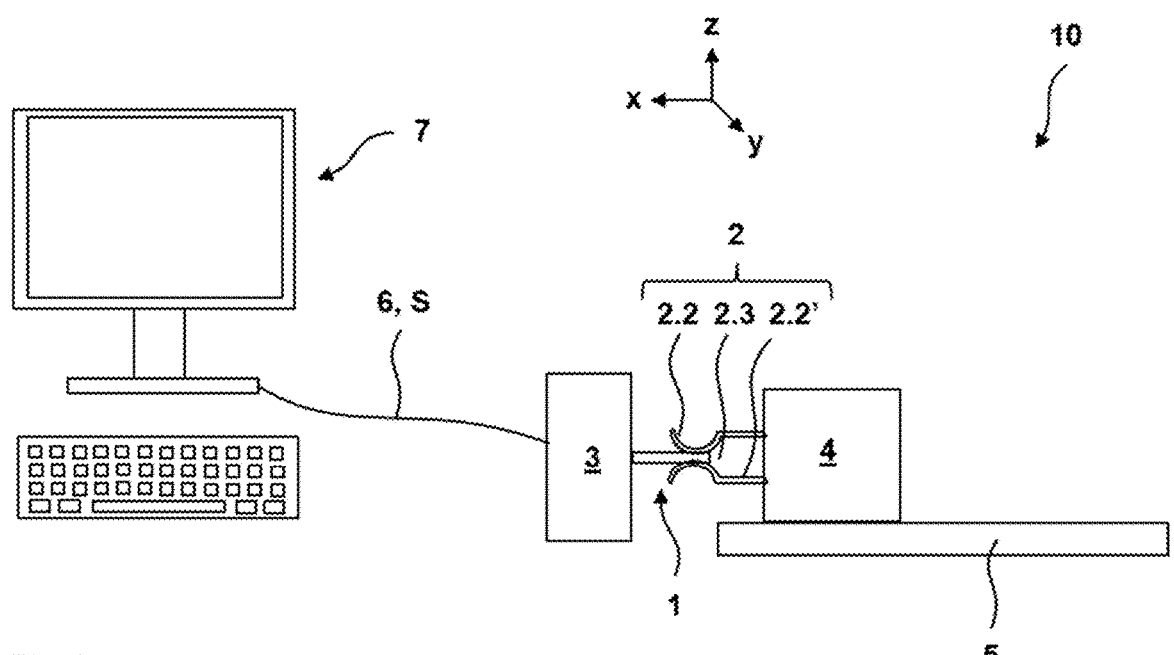
FIG. 3 shows a schematic view of the contact force measuring device comprising a measuring probe as shown in FIG. 2 after positioning the probe between the spring contact arms of the spring contact as shown in FIG. 1 in the predefined measuring position with the measuring probe.
Figure 4:
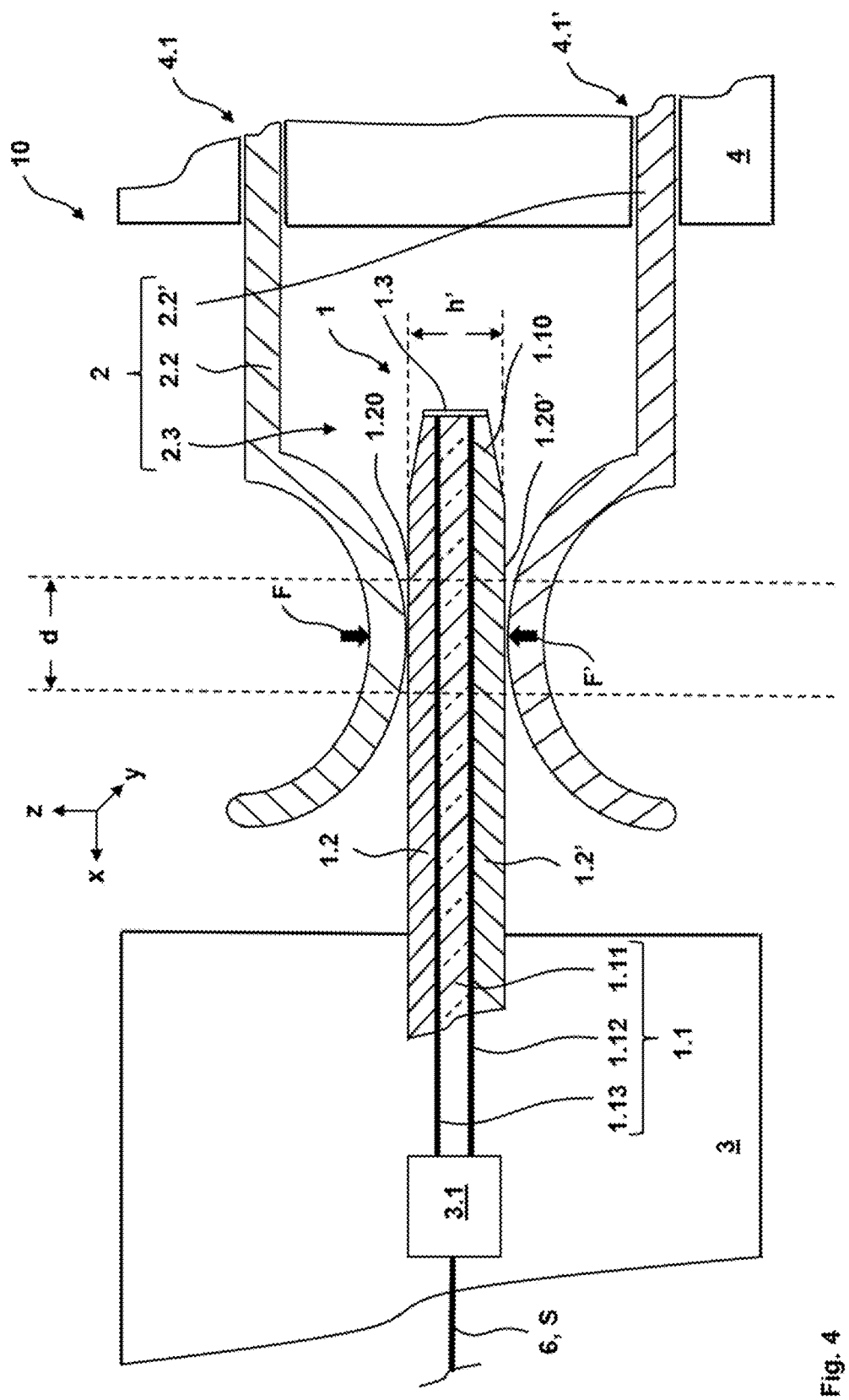
FIG. 4 shows an enlarged cross-sectional view of a portion of a first embodiment of the measuring probe of the contact force measuring device as shown in FIGS. 2 and 3 during the measurement of a contact force of the spring contact as shown in FIG. 1.
Figure 5:
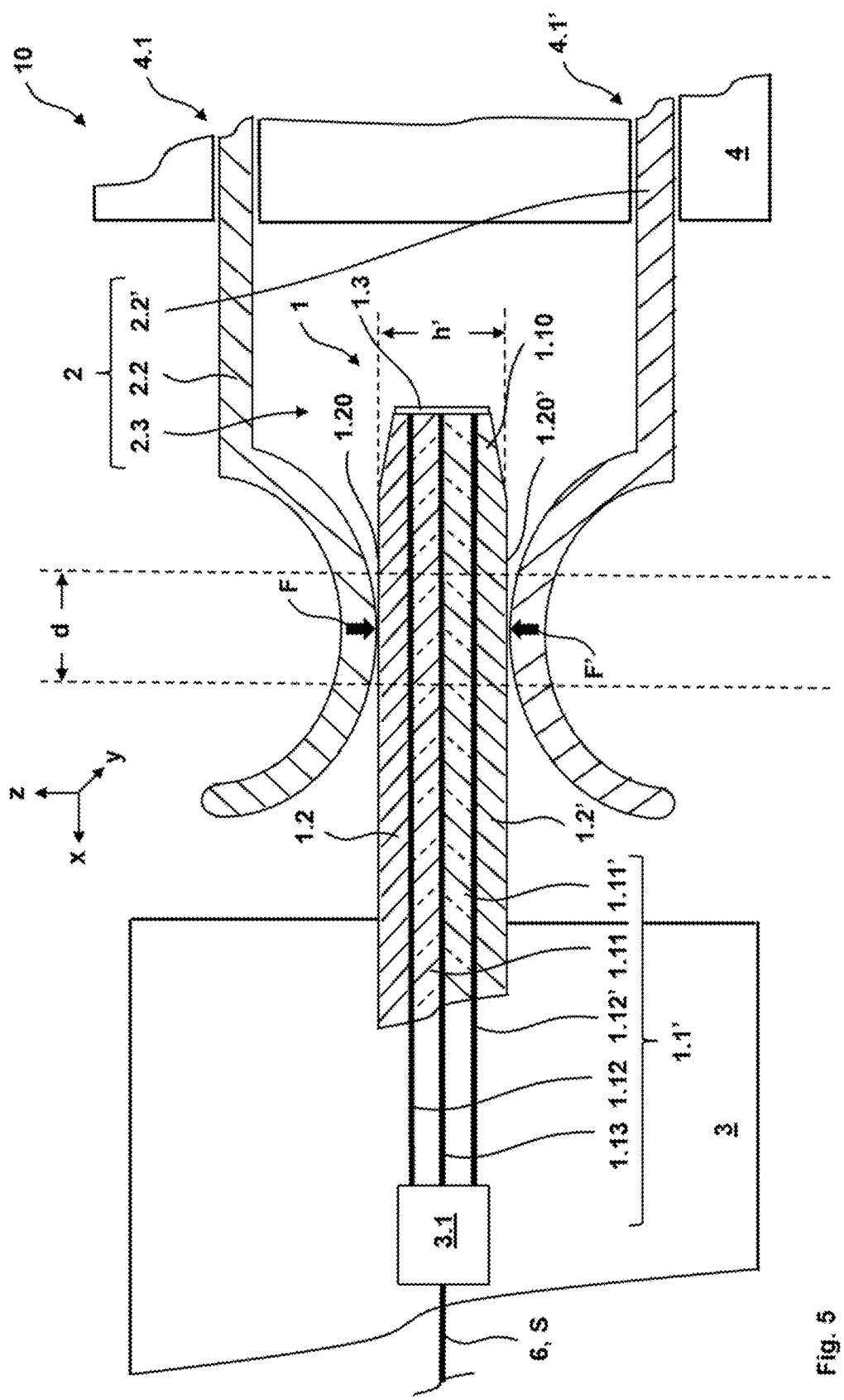
FIG. 5 shows an enlarged cross-sectional view of a portion of a second embodiment of the measuring probe of the contact force measuring device as shown in FIGS. 2 and 3 during the measurement of a contact force of the spring contact as shown in FIG. 1.

FIGS. 2 and 3 show the positioning of the spring contact arms 2.2, 2.2' in the predefined measuring position. FIGS. 4 and 5 show enlarged representations of portions of two embodiments of the measuring probe 1 as shown in FIG. 3.

Referring to FIGS. 2 to 5, the measuring probe 1 is shown in the predefined measuring state. Referring to FIGS. 3 to 5, the spring contact arms 2.2, 2.2' are shown positioned in the predefined measuring position. In this case, measuring probe 1 will then be received along the vertical axis z with its height h' between the spring contact arms 2.2, 2.2'. Then, spring contact arms 2.2, 2.2' contact the measuring probe 1 in the contact area d.

In referring to FIG. 4 and FIG. 5, the measuring probe 1 now will be explained in more detail.

Measuring probe 1 comprises a measuring element 1.1 (FIG. 4), 1.1' (FIG. 5) and two insulator elements 1.2, 1.2'. The two insulator elements 1.2, 1.2' are identical and in common to the embodiments depicted in FIG. 4 and FIG. 5. The measuring element 1.1, 1.1' is arranged between the two insulator elements 1.2, 1.2' with regard to the vertical axis z. A first insulator element 1.2 is disposed directly above the measuring element 1.1, 1.1' and can be denoted an upper insulator element 1.2. A second insulator element 1.2' is disposed directly below the measuring element 1.1, 1.1' and can be denoted as a lower insulator element 1.2'. The measuring element 1.1, 1.1' and insulator elements 1.2, 1.2' are mechanically connected to one another. The measuring element 1.1, 1.1' is preferably connected to the two insulator elements 1.2, 1.2' by a material bond. These material bonds are achieved by diffusion welding (thermocompression bonding), soldering, bonding by electrically conductive adhesive material and the like.

In a first embodiment shown in FIG. 4, the measuring element 1.1 of the measuring probe 1 comprises a piezoelectric element 1.11. In the second embodiment shown in FIG. 5, the measuring element 1.1' of the measuring probe 1 comprises two piezoelectric elements 1.11, 1.11'. The two piezoelectric elements 1.11, 1.11' are identical. Each piezoelectric element 1.11, 1.11' elongates in a first direction that is along the horizontal direction x in FIG. 4 and FIG. 5. Each piezoelectric element 1.11, 1.11' defines an upper planar surface disposed opposite a lower planar surface, wherein the upper planar surface is spaced apart from the lower planar surface in a second direction that is along the vertical direction z in FIG. 4 and FIG. 5. Each of the upper planar surface and the lower planar surface resides in an X-Y plane in FIG. 4 and FIG. 5.

The piezoelectric element 1.11, 1.11' may be made of piezoelectric crystal such as ($SiO_2$ single crystal), calcium gallo-germanate ($Ca_3Ga_2Ge_4O_{14}$ or CGG), langasite ($La_3Ga_5SiO_{14}$ or LGS), tourmaline, gallium orthophosphate and the like. However, the piezoelectric element 1.11, 1.11' may also be made of piezoceramics such as barium titanate ($BaTiO_3$), mixtures (PZT) of lead titanate ($PbTiO_3$) and lead zirconate ($PbZrO_3$) and the like as well as of piezoelectric polymers such as polyvinylidene fluoride (PVDF), polyvinyl fluoride (PVF), polyvinyl chloride (PVC) and the like. If the piezoelectric element 1.11, 1.11' is made of piezoelectric crystal, it is cut in a defined crystal orientation. If the piezoelectric element 1.11, 1.11' consists of piezoelectric polymers, it is available as thin films.

Preferably, for achieving the piezoelectric longitudinal effect the piezoelectric element 1.11, 1.11' will be oriented in such a crystallographic orientation that under the impact of the contact force F, F' schematically shown respectively in FIG. 4 and FIG. 5, electrically negative charges are generated on a first surface and electrically positive charges are generated on a second surface spaced apart from the first surface in the vertical direction z.

In the first embodiment of the measuring probe 1 as shown in FIG. 4, a piezoelectric element 1.11 is arranged so that with its first surface it faces the first insulator element 1.2 and with its second surface it faces the second insulator element 1.2'. In the second embodiment of the measuring probe 1 as shown in FIG. 5, a first piezoelectric element 1.11 and a second piezoelectric element 1.11' are arranged with their first surfaces 1.13 facing each other. In addition, the respective second surfaces 1.12, 1.12' of the respective piezoelectric elements 1.11, 1.11' are arranged facing a respective insulator element 1.2, 1.2' of the two insulator elements 1.2, 1.2'. Because of the two piezoelectric elements 1.11, 1.11' the measuring probe 1 of the second embodiment is twice as sensitive as compared to the measuring probe 1 of the first embodiment.

The piezoelectric element 1.11, 1.11' and the insulator elements 1.2, 1.2' are formed as plates. Each piezoelectric element 1.11, 1.11' and each insulator element 1.2, 1.2' has a length of for example 12 mm along the horizontal axis x and a height of for example 0.2 mm along the vertical axis z and a width of for example 2.4 mm along the diagonal axis y. Thus, in the first embodiment as shown in FIG. 4, the measuring probe 1 has a length of 12 mm, a height h' of 0.6 mm and a width of 2.4 mm. In the second embodiment as shown in FIG. 5, the measuring probe 1 has a length of 12 mm, a height h' of 0.8 mm and a width of 2.4 mm. Thus, the measuring probe 1 according to the first embodiment in FIG. 4 is constructed to receive a contact pin 2.1 of spring contact 2 of 0.6 mm in height h while the measuring probe 1 according to the second embodiment in FIG. 5 is constructed to receive a contact pin 2.1 of spring contact 2 of 0.8 mm in height h.

Those skilled in the art knowing the present invention may also use measuring probes with smaller or larger dimensions. Thus, the height h of the measuring probe may be 0.4 mm. Alternatively, the width of the measuring probe in the diagonal direction y in FIG. 4 and FIG. 5 may be 10 mm or more.

Several surfaces of the piezoelectric element 1.11, 1.11' are metallized. This metallization has a height of less than or equal to ($\leq$) 0.1 mm along the vertical axis z. Metallizing may be achieved by means of thermal lamination of a metal foil or by metal deposition. Copper, copper alloys, gold, gold alloys, aluminum, aluminum alloys, silver, silver alloys and the like may be used as the metal.

The piezoelectric element 1.11, 1.11' is metallized on its first surfaces. The metallization of the first surface has an electrical functionality. Electrically negative charges are tapped via the metallization of the first surface. The metallization of the first surface is represented as the signal electrode 1.13 in FIG. 4 and FIG. 5.

Moreover, the metallization of the first surface has a joining functionality. In the first embodiment of the measuring probe 1 as shown in FIG. 4, the metallization of the first surface provides a mechanical connection of the first insulator element 1.2 and the first piezoelectric element 1.11. In the second embodiment of the measuring probe 1 as shown in FIG. 5, the metallization of the first surface provides a mechanical connection of the first piezoelectric element 1.11 and the second piezoelectric element 1.11'.

Furthermore, the piezoelectric element 1.11, 1.11' is metallized on its second surfaces. The metallization of the second surface has an electrical functionality. Electrically positive charges are tapped via the metallization of the second surface. In the first embodiment of the measuring probe 1 as shown in FIG. 4, the metallization of the second surface of the piezoelectric element 1.11 is represented as the ground electrode 1.12. The ground electrode 1.12 is grounded. In the second embodiment of the measuring probe 1 as shown in FIG. 5, the metallization of the second surface of the first piezoelectric element 1.11 is represented as the first ground electrode 1.12 and the metallization of the second surface of the second piezoelectric element 1.11' is represented as the second ground electrode 1.12'. Ground electrodes 1.12, 1.12' are also grounded.

Furthermore, the metallization of the second surface has a joining functionality. In the first embodiment of the measuring probe 1 as shown in FIG. 4, the metallization of the second surface provides a material bond between the piezoelectric element 1.11 and the second insulator element 1.2'. In the second embodiment of the measuring probe 1 as shown in FIG. 5, the metallization of the second surface provides a material bond between the first piezoelectric element 1.11 and the first insulator element 1.2 and between the second piezoelectric element 1.11' and the second insulator element 1.2'.

Preferably, as schematically shown in FIG. 4 and FIG. 5, the tapped electrically negative charges are transmitted via signal electrode 1.13 to a signal converter 3.1 of the holding device 3 schematically shown in FIG. 2 and FIG. 3. Signal converter 3.1 electrically amplifies an amount of electrically negative charges tapped per unit of time and digitizes the amplified amount of electrical charges resulting in measurement signals S. The measurement signals S are transmitted to the evaluation unit 7 (FIG. 2 and FIG. 3) via signal line 6. In addition, the tapped electrically positive charges may also be transmitted to the signal converter 3.1 of the holding device 3 via the first and the second ground electrodes 1.12, 1.12'. Furthermore, the amount of electrically positive charges tapped per unit of time may be electrically amplified by the signal converter 3.1 and may be digitized resulting in measurement signals S. Those skilled in the art knowing the present invention may also choose not to electrically amplify and not to digitize the tapped amount of electrically positive charges, for example by grounding the first and second ground electrodes.

The insulator element 1.2, 1.2' is made of electrically insulating material such as $Al_2O_3$, sapphire, ceramics, $Al_2O_3$ ceramics and the like. Thus, insulator element 1.2, 1.2' electrically insulates the signal electrode 1.13 and ground electrodes 1.12, 1.12' from the spring contact arms 2.2, 2.2'.

In addition, the insulator element 1.2, 1.2' further consists of abrasion-resistant material such as $Al_2O_3$ sapphire, ceramics, $Al_2O_3$ ceramics and the like. Preferably, as schematically shown in FIG. 4 and FIG. 5, the insulator element 1.2, 1.2' comprises a contact surface 1.20, 1.20' by which contact surface 1.20, 1.20' the insulator element 1.1, 1.2' directly contacts a spring contact arm 2.2, 2.2'. Contact surface 1.20, 1.20' desirably has a Vickers hardness in the range of 1200 to 1500. Thus, the contact surface 1.20, 1.20' of the insulator element 1.2, 1.2' is very abrasion-resistant enabling a very high number of contacts of $10^6$. The number of contacts is the number of contacts that the probe 1 makes with the spring contact arms 2.2, 2.2' during operation of the contact force measuring device 10.

Furthermore, the insulator element 1.2, 1.2' also consists of rigid material such as $Al_2O_3$ sapphire, ceramics, $Al_2O_3$ ceramics and the like. The insulator element 1.2, 1.2' desirably has a modulus of elasticity (elastic modulus) ranging from 350 GPa to 470 GPa.

Further, as schematically shown in FIG. 4 and FIG. 5, measuring probe 1 comprises at least one lateral insulating surface 1.3 disposed at the extreme free end thereof. The lateral insulating surface 1.3 protects the piezoelectric element 1.1, 1.1', ground electrode 1.12, 1.12' and signal electrode 1.13 from harmful environmental impacts such as impurities (dust, moisture and the like) and from electrical and electromagnetic interference effects in the form of electromagnetic radiation. The lateral insulating surface 1.3 substantially completely surrounds the measuring probe 1 on the lateral surfaces thereof. The lateral surfaces lie in an xz plane formed by the horizontal axis x and the vertical axis z and in an yz plane formed by the diagonal axis y and the vertical axis z. The cross-sectional view of FIGS. 4 and 5 shows the lateral insulating surface 1.3 surrounding the front end 1.10 of measuring probe 1 in the yz plane. In the cross sectional view of FIGS. 4 and 5 the lateral insulating surface 1.3 in the xz plane is not visible. The lateral insulating surface 1.3 is made of material that is electrically insulating and abrasion-resistant such as $Al_2O_3$ sapphire, ceramics, Al2O3 ceramics and the like. The lateral insulating surface 1.3 has a thickness measured along the horizontal direction X in FIGS. 4 and 5 of less than or equal to ($\leq$) 0.1 mm. Advantageously, the lateral insulating surface 1.3 is deposited onto the lateral surfaces of the measuring probe 1 by sputtering, chemical vapor deposition and the like.

In the predefined measuring position schematically shown in FIGS. 4 and 5, spring contact arms 2.2, 2.2' contact the measuring probe 1 in a contact area d measured along the horizontal axis x. Spring contact arms 2.2, 2.2' directly contact the contact surfaces 1.20, 1.20' of the insulator elements 1.2, 1.2'. A length of the contact area d along the horizontal axis x is for example equal to 1 mm. Thus, the length of the contact area desirably is greater by a factor of 40 than the spatial resolution specific for the spring contact of the positioning device 5 and the holding device 3, each of which is less than +/−25 µm. Furthermore, in case of a preferred spatial resolution specific for the spring contact of positioning device 5 and holding device 3 of +/−5 µm, then the length of the contact area d is even greater by a factor of 200.

Figure 6:
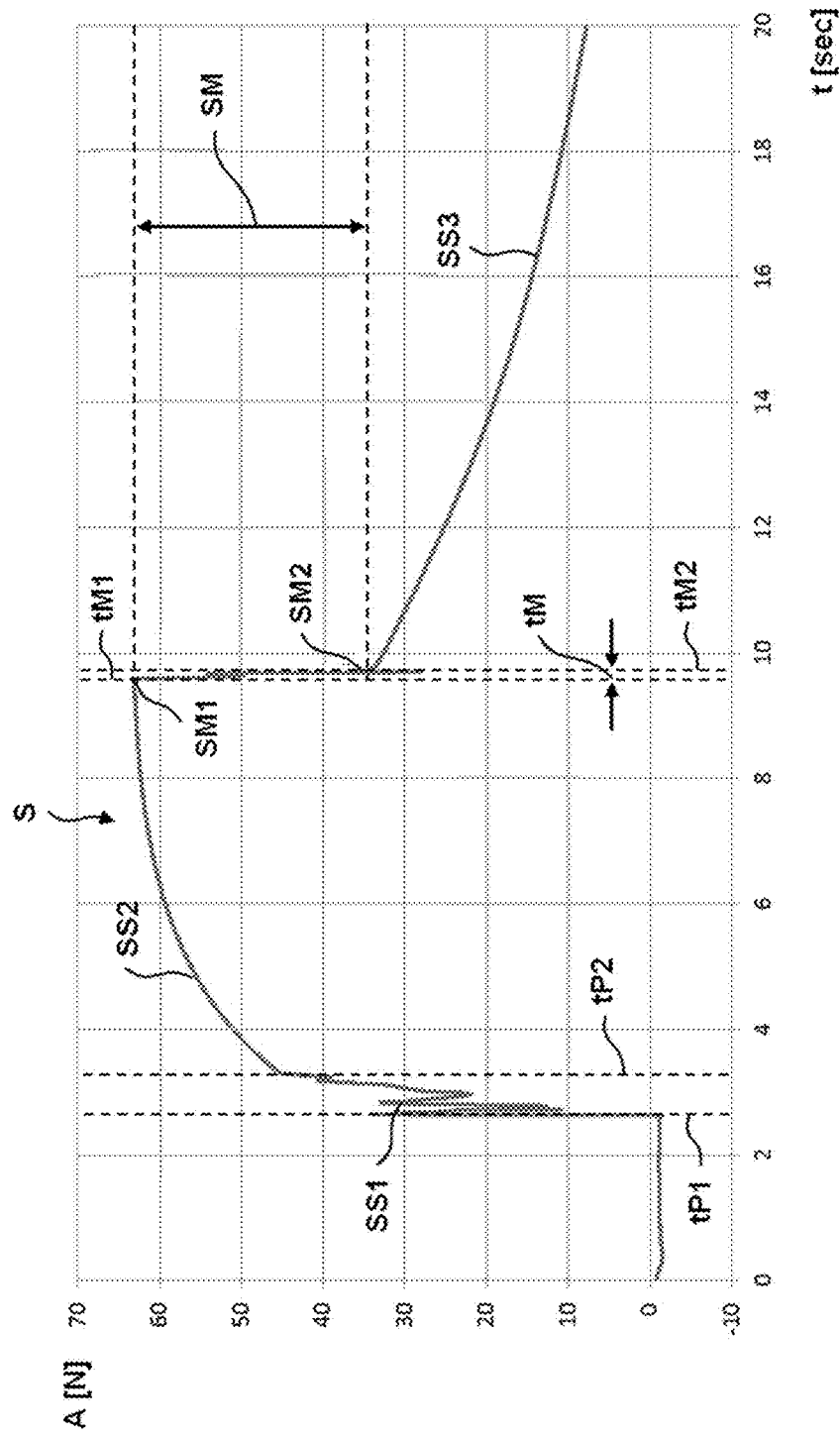
FIG. 6 is a graphic representation of a result of an evaluation of measurement signals in the evaluation unit of the contact force measuring device as shown in FIG. 2 or 3.

FIG. 6 is a representation of a result of an evaluation of the measurement signals S in the evaluation unit 7. Evaluation unit 7 comprises an electronic processor, a physical data memory and a physical interface. An evaluation program is stored in the physical data memory from where it is loaded into the electronic processor. The evaluation program loaded into the electronic processor is executed by the electronic processor. The measurement signals S are transmitted to the physical interface of the evaluation unit 7 via the signal line 6. From the physical interface, the measurement signals S are input into the loaded evaluation program and the electronic processor executes the evaluation program to evaluate the measurement signals S. A result of the evaluation of the measurement signals S is shown in FIG. 6 in a graphic presentation. Preferably, the result of the evaluation of the measurement signals S is displayed on a screen of the evaluation unit 7.

A measurement procedure is shown in FIG. 6. The measurement procedure is a course of measuring the contact force F, F' by the contact force measuring device 10 as shown in FIGS. 2 to 5 as a function of time. The measurement procedure comprises positioning the spring contact arms 2.2, 2.2' in the predefined measuring position, measuring the contact force F, F', and removing the spring contact arms 2.2, 2.2' out of the predefined measuring position. The ordinate shows a signal strength A of the measurement signals S in Newtons (N), and on the abscissa is plotted a time t in seconds (sec). The measurement procedure takes around 10 sec (from t=0 sec to t=10 sec).

During the first 3.5 sec of the measurement procedure (from t=0 sec to t=3.5 sec), the supporting device 4 with the spring contact arms 2.2, 2.2' mechanically attached thereto is positioned in the predefined measuring position.

At a first positioning time tP1, the spring contact arms 2.2, 2.2' touch the tapered front end 1.10 of the measuring probe 1 and the spring contact arms 2.2, 2.2' are deflected along the vertical axis z. This is characterized by a sudden increase in signal strength A.

Only at a second positioning time tP2 is the measuring probe 1 completely received in the contact opening 2.3 of the spring contact arms 2.2, 2.2' as shown in FIGS. 4 and 5. As shown in FIGS. 4 and 5, the measuring probe 1 is then positioned with its height h' along the vertical axis z between the spring contact arms 2.2, 2.2'. In this case, spring contact arms 2.2, 2.2' contact the measuring probe 1 in the contact area d.

In the time difference between the first positioning time tP1 and the second positioning time tP2 the spring contact arms 2.2, 2.2' rub over the contact surfaces 1.20, 1.20' of the measuring probe 1. During this time, further electrical charges are generated by the piezoelectric element 1.11, 1.11'. These further electrical charges are electrically amplified by the signal converter 3.1 and digitized resulting in first interference signals SS1. The evaluation program being executed by the electronic processor desirably is configured to exclude these first interference signals SS1 from the measurement procedure.

When the spring contact arms 2.2, 2.2' have contacted the measuring probe 1 in the contact area d and the spring contact arms 2.2, 2.2' no longer rub over the contact surfaces 1.20, 1.20' of the measuring probe 1, no further electrical charges are generated by the piezoelectric element 1.11, 1.11'.

When the spring contact arms 2.2, 2.2' rub over the contact surfaces 1.20, 1.20' of the measuring probe 1, electrical surface charges accumulate in small pores of surfaces of the insulator elements 1.2, 1.2' and the piezoelectric element 1.11, 1.11' which are dissipated via the signal electrode 1.13 with a time constant. The electrical surface charges are electrically amplified by the signal converter 3.1 resulting in second interference signals SS2 that are digitalized. The second interference signals SS2 decrease over the time t. The evaluation program being executed by the electronic processor desirably is configured so that a period of time of 5.5 sec (from t=3.5 sec to t=9.0 sec) is waited for the signal strength A to assume a largely constant value over time so that the second interference signals SS2 are excluded from the measurement procedure. The evaluation program being executed by the electronic processor desirably is configured so that when a change $\Delta A$ in signal strength A with respect to a change $\Delta t$ in time t falls within a range of $0.9 \leq \Delta A/\Delta t \leq 1.1$, then more than 90% of the surface electrical charges have been dissipated via the signal electrode 1.13 and the value of the signal strength A is deemed to have become largely constant over time.

When the spring contact arms 2.2, 2.2' have contacted the measuring probe 1 in the contact area d, then the spatially deflected spring contact arms 2.2, 2.2' exert the contact force F, F' along the vertical axis z as schematically shown in FIGS. 4 and 5. In accordance with one aspect of the present invention, any further force component that acts along the horizontal axis x and/or the diagonal axis y resulting from oblique mating of the spring contact arms 2.2, 2.2' and the measuring probe 1 is eliminated by the floating bearing 4.1, 4.1' of the spring contact arms 2.2, 2.2' in the supporting device 4. This additional force component acts on the floating bearing 4.1, 4.1' along the horizontal axis x and/or the diagonal axis y to realign the spring contact arms 2.2, 2.2' in the floating bearing 4.1, 4.1'. This spatial realignment of the spring contact arms 2.2, 2.2' in the supporting device 4 prevents any oblique mating of the spring contact arms 2.2, 2.2' with the measuring probe 1.

The evaluation program being executed by the electronic processor desirably is configured so that when more than 90% of the electrical surface charges have been dissipated via the signal electrode 1.13, then the measurement of the contact force F, F' is started at a first time point tM1 shown schematically in FIG. 6. The signal strength A is recorded as the first measurement signal SM1 at this time point tM1. In the example shown in FIG. 6, the first measurement signal SM1 has a value of 63N that is constant over time. The evaluation program is configured to store the first measurement signal SM1 in the physical data memory.

The spring contact arms 2.2, 2.2' are removed out of the predefined measuring position. This is characterized by a sudden drop in signal strength A. At this sudden drop in signal strength A, the change $\Delta A$ in signal strength A with respect to the change $\Delta t$ in time t meets the condition $\Delta A/\Delta t$ is greater than or equal to ($\geq$) 5.

The end of the measurement procedure is reached at a second time point tM2 schematically shown in FIG. 6 when the spring contact arms 2.2, 2.2' no longer contact the measuring probe 1. At this second time point tM2, the signal strength A no longer shows the sudden drop in signal strength A. The change $\Delta A$ in signal strength A with respect to the change $\Delta t$ in time t no longer meets the condition $\Delta A/\Delta t$ is greater than or equal to ($\geq$) 5. At the second time point tM2 schematically shown in FIG. 6, the signal strength A attains a value of 35N being the second measurement signal SM2. The evaluation program is configured to store the second measurement signal SM2 in the physical data memory.

As schematically sown in FIG. 6, a measurement time tM is the time difference between the first time point tM1 and the second time point tM2 and is less than 0.5 sec. The evaluation program is configured to determine an effective measurement signal SM. The effective measurement signal SM is the difference between the first measurement signal SM1 and the second measurement signal SM2 and is 28N in the example presented in FIG. 6. The effective measurement signal SM is a measure of the contact force F, F'.

During the measuring time tM, the spring contact arms 2.2, 2.2' rub over the contact surfaces 1.20, 1.20' of the measuring probe 1. When the spring contact arms 2.2, 2.2' rub over the contact surfaces 1.20, 1.20' of the measuring probe 1, electrical surface charges again accumulate in small pores of surfaces of the insulator elements 1.2, 1.2' and the piezoelectric element 1.11, 1.11', and these electrical surface charges are dissipated via the signal electrode 1.13 with a time constant. These electrical surface charges are electrically amplified by the signal converter 3.1 and result in the third interference signals SS3 that are schematically shown in FIG. 6, and the third interference signals SS3 are digitalized. The evaluation program desirably is configured to exclude the third interference signals SS3 from the measurement.

The insulator element 1.2, 1.2' and insulator surface 1.3 may be metallized on the outside. The metallization may be achieved by thermal lamination with a metal foil or by metal deposition. Copper, copper alloys, gold, gold alloys, aluminum, aluminum alloys, silver, silver alloys and the like may be used as the metal. Thus, the external contact surfaces 1.20, 1.20' schematically shown in FIGS. 4 and 5 of insulator elements 1.2, 1.2' may be metallized. The external metallization serves for electromagnetic compatibilization. The external metallization is grounded. The reason for grounding the external metallization of the external contact surfaces 1.20, 1.20' is that when the spring contact arms 2.2, 2.2' are rubbed over the contact surfaces 1.20, 1.20' of the measuring probe 1, then electrical surface charges are generated and such electrical surface charges are dissipated to ground potential by the external metallization.

LIST OF REFERENCE NUMERALS

1 measuring probe
1.1, 1.1' measuring element
1.10 front end
1.11, 1.11' piezoelectric element
1.12, 1.12' ground electrode
1.13 signal electrode
1.2, 1.2' insulator element
1.20, 1.20' contact surfaces
1.3 insulator surface
2 spring contact
2.1 contact pin
2.10 tapered front end
2.2, 2.2' spring contact arm
2.3 contact opening
3 holding device
3.1 signal converter
4 supporting device
4.1, 4.1' floating bearing
5 positioning device
6 signal line
7 evaluation unit
10 contact force measuring device
A signal strength
d contact area
F, F' contact force
h height of contact pin
h' height of measuring probe
S measurement signal
SM effective measurement signal
SM1, SM2 measurement signal
SS1, SS2, SS3 interference signal
t time
tM measurement time
tM1, tM2 time point
tP1, tP2 positioning time
x horizontal axis
y diagonal axis
z vertical axis

What is claimed is:

1. A contact force measuring device for measuring a contact force of a spring contact of a socket of an electrical plug-in connector that includes a contact pin, which is elongating in a first direction and which is defining a height measuring in a second direction that is perpendicular to the first direction, the spring contact including a pair of spring contact arms spaced apart in the second direction to define a contact channel between the pair of spring contact arms, wherein when the contact pin is inserted into the contact channel the spring contact arms apply a contact force in the second direction onto the contact pin to effect an electrical connection of the electrical plug-in connector, the contact force measuring device comprising:
a measuring probe elongating in the first direction, the measuring probe including a measuring element elongating in the first direction and defining an upper planar surface disposed opposite a lower planar surface, wherein the upper planar surface is spaced apart from the lower planar surface in the second direction, the measuring probe including an upper insulator element contacting the upper planar surface, a lower insulator element contacting the lower planar surface, the measuring probe defining a contact region having a height measured in the second direction identical to the height of the contact pin;
wherein each of the upper and lower insulator elements of the measuring probe is configured and disposed to contact the spring contact arms of the socket when the probe is inserted between the spring contact arms of the socket.

2. The contact force measuring device according to claim 1, wherein each of the upper and lower insulator elements defines a contact surface having a Vickers hardness in the range of 1200 to 1500 and is configured to directly contact with a respective one of the spring contact arms.

3. The contact force measuring device according to claim 2, wherein each of the upper and lower insulator elements has a modulus of elasticity (elastic modulus) in the range of 350 GPa to 470 GPa.

4. The contact force measuring device according to claim 1, wherein each of the upper and lower insulator elements has a modulus of elasticity (elastic modulus) in the range of 350 GPa to 470 GPa.

5. The contact force measuring device according to claim 1, further comprising a holding device secured mechanically to a first end of the measuring probe; wherein the holding device is configured to hold the measuring probe in a predefined measuring state along three axes (x, y, z) with a spatial resolution specific for the spring contact.

6. The contact force measuring device according to claim 1, further comprising a supporting device configured for mechanically securing the spring contact arms; and wherein the supporting device includes a floating bearing that is configured to support one of the spring contact arms along a horizontal axis (x) and a diagonal axis (y).

7. The contact force measuring device according to claim 1, further comprising a positioning device that is configured to position the spring contact arms in a predefined measuring position positioned at least along a horizontal axis (x) with a spatial resolution specific for the spring contact.

8. Process for using a contact force measuring device to measure a contact force of a spring contact that includes a contact pin and spring contact arms wherein when the contact pin contacts the spring contact arms in a contact region defined between the contact arms and the spring contact arms exert the contact force onto the contact pin in the contact region, the process comprising the steps of:

using a positioning device of the contact force measuring device to position the spring contact arms of the spring contact in a predefined measuring position;

holding a measuring probe of the contact force measuring device in a holding device in a predefined measuring state, wherein the measuring probe elongates in a first direction and has a height in a second direction, which is perpendicular to the first direction, wherein the height of the measuring probe in a contact region is identical to the height of the contact pin of the spring contact, and wherein the measuring probe defines insulator elements on opposing sides of the measuring probe in the contact region of the measuring probe;

moving the measuring probe toward the spring contact arms of the spring contact until the contact region of the measuring probe is inserted into the contact region defined between the spring contact arms of the spring contact so that the insulator elements on opposing sides of the measuring probe are in contact with the spring contact arms in the predefined measuring position; and measuring the contact force of the spring contact by evaluating the signals generated by the measuring probe when the contact region of the measuring probe is situated in the contact region defined between the spring contact arms of the spring contact.

9. The process according to claim 8, wherein the measuring probe is held in the predefined measuring state by the holding device along three mutually orthogonal axes (x, y, z) with a spatial resolution specific for the spring contact.

10. The process according to claim 8, wherein the spring contact arms are positioned in the predefined measuring position by the positioning device along at least one horizontal axis (x) with a spatial resolution specific for the spring contact.

11. The process according to claim 8, wherein the spring contact arms are supported by a supporting device with at least one floating bearing along a horizontal axis (x) and a diagonal axis (y) such that movement of the supporting device is permitted along the horizontal axis and along the diagonal axis; and wherein a further force component along the horizontal axis (x) and/or the diagonal axis (y) realigns the spring contact arms in the floating bearing.

12. The process according to claim 8, wherein the measuring probe includes a piezoelectric element that generates electrical charges under the effect of the contact force; wherein the measuring probe includes electrodes that tap the electrical charges; wherein the tapped electrically negative charges are transmitted to a signal converter via a signal electrode; and wherein a quantity of electrically negative charges tapped per unit of time is electrically amplified by the signal converter and digitized into resulting measurement signals.

13. The process according to claim 12, wherein when the measuring probe is positioned in the predefined measuring position the spring contact arms rub over the insulator elements and generate electrical surface charges, which electrical surface charges are dissipated via the signal electrode with a time constant; wherein after the spring contact arms are positioned in the predefined measuring position the measurement of the contact force is started at a first time point when more than 90% of the electrical surface charges have been dissipated; and wherein at the first time point a signal strength of the measurement signals is detected as the first measurement signal.

14. The process according to claim 13, further comprising the steps of: removing the spring contact arms out of the predefined measuring position; when the spring contact arms have been removed out of the predefined measuring position a signal strength of the measurement signals suddenly drops; when at a second time point the spring contact arms no longer contact the measuring probe the signal strength of the measurement signals no longer suddenly drops; and wherein at the second time point the signal strength of the measurement signals is detected as a second measurement signal.

15. The process according to claim 14, further comprising the steps of: determining a differential value between the first measurement signal and the second measurement signal as the effective measurement signal of the contact force.

* * * * *